United States Patent
Huang et al.

(10) Patent No.: US 7,359,963 B1
(45) Date of Patent: Apr. 15, 2008

(54) SYSTEM AND METHOD FOR MAINTAINING AND PUBLISHING WEB SITE CONTENT

(75) Inventors: Jong Huang, Bellevue, WA (US); Ian Marriott, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1054 days.

(21) Appl. No.: 10/457,119

(22) Filed: Jun. 9, 2003

(51) Int. Cl.
*G06F 15/173* (2006.01)
(52) U.S. Cl. .............. 709/223; 709/203; 709/219; 707/10; 707/100
(58) Field of Classification Search ............. 709/203, 709/217–219, 223; 707/10, 100
See application file for complete search history.

(56) References Cited

U.S. PATENT DOCUMENTS

| | | | |
|---|---|---|---|
| 6,430,563 B1 * | 8/2002 | Fritz et al. ................. 707/10 |
| 6,567,799 B2 * | 5/2003 | Sweet et al. ................. 707/3 |
| 6,654,737 B1 * | 11/2003 | Nunez ........................ 707/3 |
| 6,694,333 B2 * | 2/2004 | Oldham .................... 709/217 |
| 6,963,914 B1 * | 11/2005 | Breitbart et al. ........... 709/225 |
| 6,973,438 B1 * | 12/2005 | Philyaw ..................... 705/26 |
| 6,973,456 B1 * | 12/2005 | Elgart ....................... 709/219 |
| 6,985,936 B2 * | 1/2006 | Agarwalla et al. ......... 709/223 |
| 2001/0054068 A1 * | 12/2001 | Modiano .................. 709/203 |
| 2003/0115171 A1 * | 6/2003 | Mangalvedhekar .......... 707/1 |
| 2003/0135824 A1 * | 7/2003 | Ullmann et al. ........... 715/513 |
| 2004/0093325 A1 * | 5/2004 | Banerjee et al. ............. 707/3 |

* cited by examiner

*Primary Examiner*—Philip Tran
(74) *Attorney, Agent, or Firm*—Shook, Hardy & Bacon LLP (57) ABSTRACT

A method and system are provided for providing a physical object for a web site in response to a user request. The system includes a staging server having a logical content store for storing logical content and a staging server context manager including a rendering component for rendering a physical object from the logical content. The system additionally includes a web server for seeking the requested physical object, the web server includes a web server context manager for seeking the requested physical object from the staging server and for returning the requested physical object to the requester.

32 Claims, 7 Drawing Sheets

SYSTEM AND METHOD FOR MAINTAINING AND PUBLISHING WEB SITE CONTENT

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The present invention relates to techniques for maintaining and publishing web site content and in particular to techniques for efficiently and cost-effectively publishing and maintaining web site content.

BACKGROUND OF THE INVENTION

News web sites have become a convenient tool for providing up-to-date news information. News providers are capable of providing large sites that provide news content for millions of unique users each day. Currently existing news web sites include various tools to help editors and producers build story pages and interactive components such as live vote and slide show components. However, current architectures have been insufficient to provide efficient and cost effective results in view of increasingly complex business and partnership proposals.

One specific problem area is the lack of content reusability and flexibility. Currently, providers use multiple databases and file systems to store site contents and multiple applications and tools to create and manage the site content. Moreover, the content is not separated from the presentations. The lack of separation makes content repurposing difficult.

A further problem with current architectures is the inadequate speed of the replication process. In general, existing systems build the pages and place them on a staging server at regular intervals, for example on an hourly basis. Replication software replicates the contents and delivers the replicated contents to web servers. The replication process can be time consuming and no editorial work can be done during the replication process, thus impeding the web site's ability to be a breaking news site.

An additional problem with existing architectures is the lack of a unified rendering architecture. Five or six different methods produce the final HTML pages for news sites. The multiple methods result in redundant systems and unnecessary maintenance efforts. Additionally, inconsistent representations of site content result from the multiple methods.

A further difficulty with present systems involves the lack of support for multiple site rendering. Under current implementations, only one site can be rendered for an 800×600 resolution screen. Accordingly, supporting site partners, such as news magazine partners, is extremely time-consuming and can lead to disadvantageous constraints.

A further difficulty with existing systems is the lack of real time statistics. Currently existing systems generate usage reports by processing user access logs produced by an Internet server such as an Internet Information Server (IIS). By the time the reports are generated, the news can be several days old. For example, for the Winter Olympics sites of 2002, the final statistics and reports, including information regarding page views, hits, unique users, etc., weren't obtained until a week after the games were completed. Real time statistics allow editors to adjust content strategy to better cater to user interests.

Accordingly, a system is needed for correcting the above-mentioned problems. A unified content store is needed that represents and manages content in a single consistent environment and supports a single consistent rendering architecture. Additionally, the system must support on-demand publishing, content archiving, multi-site rendering, and real-time statistics. A system is needed that will bring a high degree of automation to the publishing process to simplify workflow.

SUMMARY OF THE INVENTION

In one aspect, the invention includes a context management system for facilitating publication of web site content. The context management system includes a logical object retrieval component for retrieving a logical object from a logical content store. The context management system additionally includes a rendering component for rendering a physical object based on the logical object and a physical object transmission component for transmitting the physical object.

In an additional aspect, a staging server system is provided for transmitting a requested physical object to a web server. The staging server system includes a logical content store for storing a logical object and a staging server context manager. The staging server context manager includes a logical object retrieval component for retrieving the logical object from the logical content store, a rendering component for rendering a physical object based on the logical object, and a physical object transmission component for transmitting the physical object.

In yet an additional aspect, a system is provided for publishing web site content for a requester. The system includes a staging server having a logical content store for storing logical content and a staging server context manager including a rendering component for rendering a physical object from the logical content. The system additionally includes a web server for seeking the requested physical object. The web server includes a web server context manager for seeking the requested physical object from the staging server and for returning the requested physical object to the requester.

In a further aspect, a method is provided for implementing a context management system that provides a physical object to a requester. The method includes retrieving a logical object from a logical content store, rendering a physical object based on the retrieved logical object using the context management system, and returning the requested physical object.

In yet an additional aspect, a method is provided for transmitting a physical object to a requester upon receiving a request for the physical object at a web server. The method includes searching for the physical object in a web server physical site and requesting the physical object from a staging server if the physical object is not in the web server physical site. If the physical object is not in the web server physical site, the method includes searching a staging server physical site for the requested physical object. If the physical object is not found in the staging server physical site, the method includes retrieving a corresponding logical object from a staging server logical content store and rendering the physical object from the logical object if no physical object is retrieved. Finally, the method includes returning the physical object.

BRIEF DESCRIPTION OF THE DRAWINGS

The present invention is described in detail below with reference to the attached drawing figures, wherein.

DETAILED DESCRIPTION OF THE INVENTION

The invention relates to a system for providing an efficient technique for maintaining and publishing a high volume web site by reducing production costs significantly while improving end user satisfaction. The production process consists of three major steps: content creation, content management, and content delivery and presentation. The system provides a unified architecture that supports all types of content creation and facilitates the interaction between content creation tools and content management tools.

Figure 1:
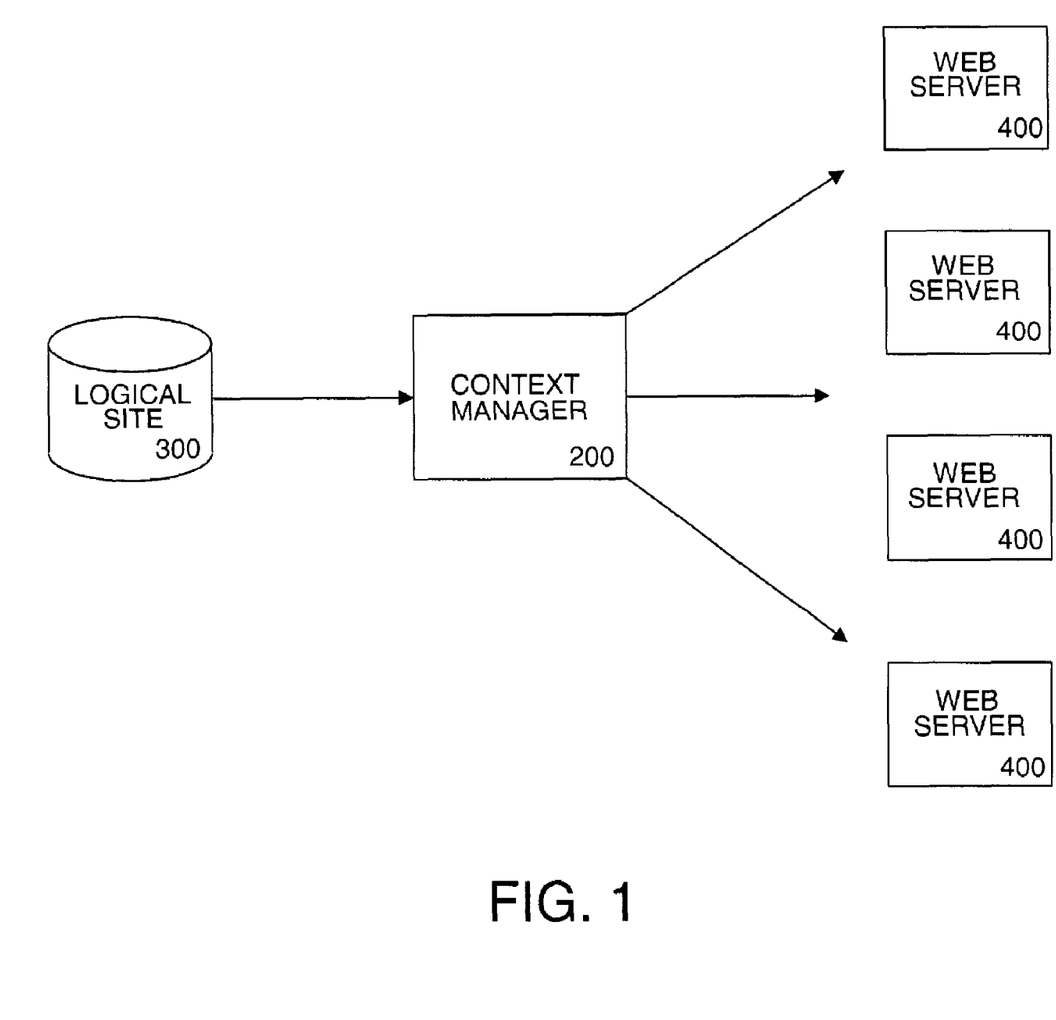
FIG. 1 is a block diagram showing a system of the invention.

FIG. 1 illustrates a conceptual model of a system of the invention. Three main conceptual building blocks for the site architecture include a logical site 300, a physical site rendered and delivered to a web server 400, and a context manager 200. The logical site 300 represents all contents without presentation information for the web servers 400. The system of the invention makes a distinction between the logical site 300, which includes contents for a site without the physical rendering, and a physical site, which includes the actual rendering of a concept. All of the physical sites are self-maintained on the web servers 400. Thus, the system of the invention is only required to manage the logical site 300. The system is capable of updating content constantly in real-time and thus eliminates the need for a publish cycle.

The physical site is a collection of rendered objects that are ready to be consumed by a web browser. A one-to many relationship can exist between the logical and physical sites. For instance, from the same logical site 300, a collection of web pages can be created for a desktop PC, a mobile or handheld PC, and partner sites, respectively. The context manager 200 handles end user HTTP requests and generates physical sites from the logical site 300 on-demand.

Figure 2:
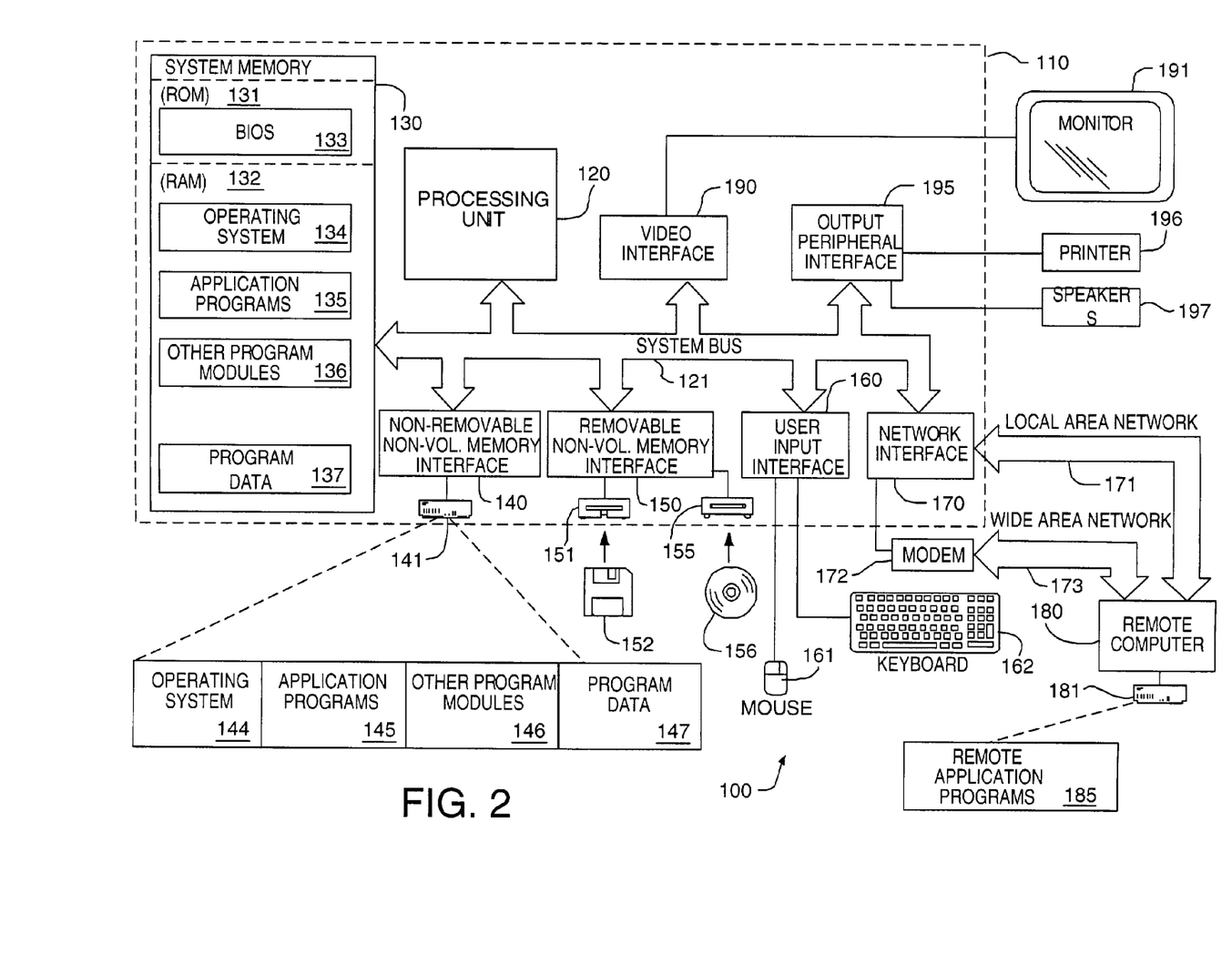
FIG. 2 is a block diagram of a suitable computing system environment for use in implementing the present invention.

The use of the logical site 300 is associated with a unified content repository for storing all logical contents. Since the logical contents do not have any presentation information in them, content reuse and repurposing are simplified. Once the logical site 300 exists, all requests from the end-user may be represented by URL's referencing logical objects rather than physical objects. The context manager 200 intercepts all requests for logical objects and decides, based on browser capabilities, language preference, and device capabilities, which physical rendering or site provides the best fit for the user. The context manager 200 then locates or renders the physical object and returns the physical object to the user. As such, the context manager 200 provides multi-site rendering support on top of a unified rendering architecture. Furthermore, the physical objects are rendered only when requested by the user, thus creating an on-demand publishing system and solving the replication issue by spreading out the replication and rendering work on an as-needed basis FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/nonremovable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Figure 3:
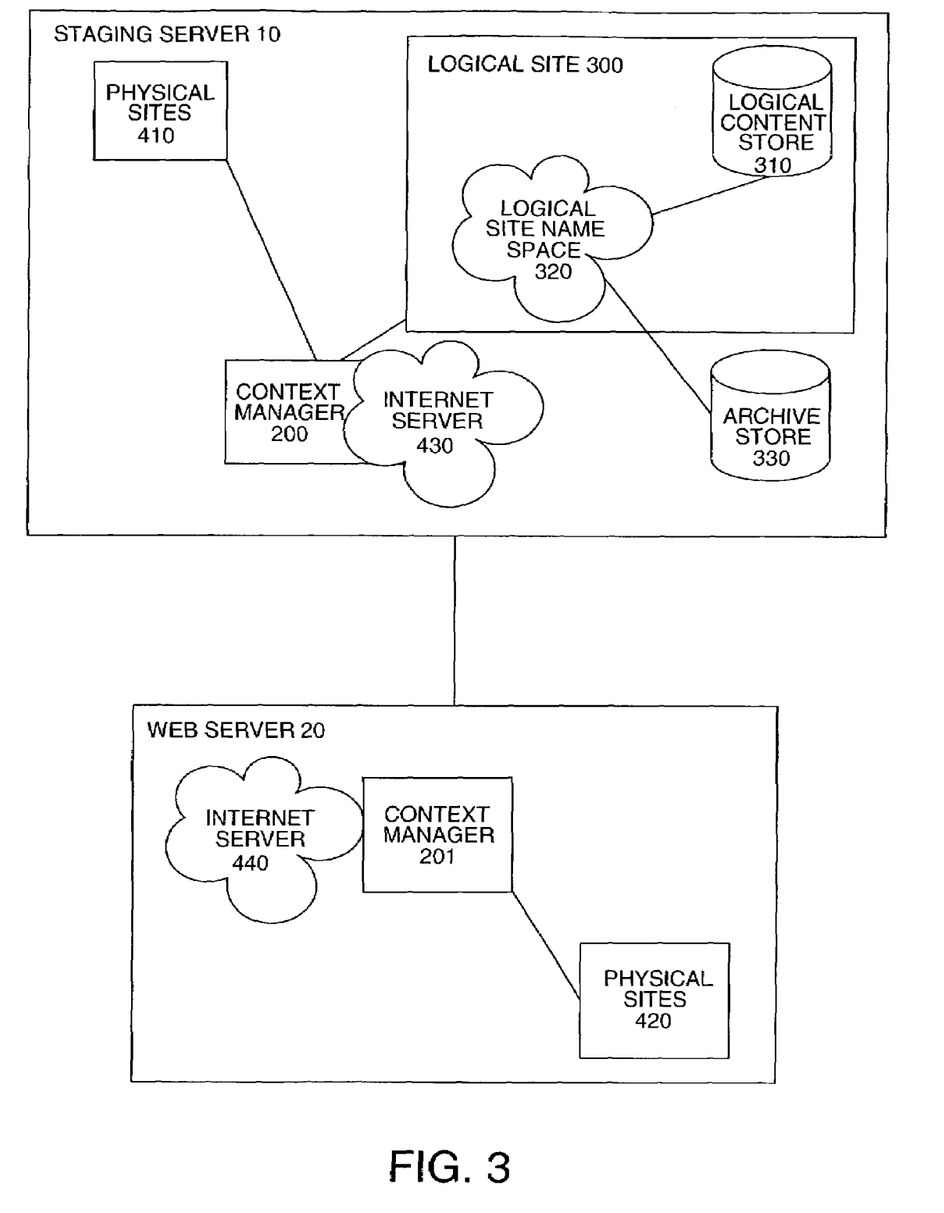
FIG. 3 is a block diagram illustrating a system architecture in accordance with an embodiment of the invention.

FIG. 3 illustrates components of a web site content production system in accordance with an embodiment of the invention. The system includes a staging server 10 and a web server 20. The staging server 10 may include one or more rendered physical sites 410, a staging server context manager 200, an Internet server 430, a logical site 300 including a logical site namespace 320 and a logical content store 310, and an archive store 330. The web server 20 may include an Internet server 440, a context manager 201, and one or more rendered physical sites 420. In both server environments, the rendered physical sites 410 and 420 may be stored in a memory device such as those described above with reference to FIG. 2. Each of the components shown in FIG. 3 is further described below.

In operation, a user URL request arrives at the web server 20. The web server 20 includes an Internet server 440 capable of receiving a URL request from a requester. However, the context manager 201 intercepts the request and attempts to obtain the physical object requested from the rendered physical sites 420 on the web server 20. If the context manager 201 is able to find the physical object in the physical site 420, it returns the physical object to the requester. If the context manager 201 is unable to find the physical object, it forwards the request to the staging server 10. The staging server context manager 200 intercepts the request directed to an Internet server 430. The staging server context manager attempts to retrieve the physical object from the rendered physical sites 410 on the staging server 10. If the physical object is not found in the physical sites 410, the staging server context manager 200 retrieves a corresponding logical object from the logical content store 310 or from the archive store 330. The staging server context manager 200 then renders the physical object from the logical object and returns the physical object to the context manager 201 within the web server 10. Each of the components for performing the above-described operations will be described further below.

The staging server 10 is preferably configured to provide content to a plurality of web servers 20. Within the staging server 10, the logical site 300 includes the logical content store 310. The logical content store 310 includes all of the contents for a site without the physical rendering. For text contents, an extensible markup language (XML) file can be used to represent the logical objects. The logical content store 310 may provide a content repository for all data types, such as text, images, audio, and video. The logical site 300 also includes the logical site name space 320, which is provided for identifying logical objects in a file system of the logical content store 310. The logical site name space 320 is the set of all possible identifiers for a group of items or persons. For example, the social security number is a name space using nine digits to uniquely identify each person in the United States. The logical site name space 320 as used by a content management system uniquely identifies every item that the system manages.

An n-tuple or ordered set of "n" values ($C_1, C_2 \ldots C_k, T_1, T_2 \ldots T_m, N_1, N_2 \ldots N_n$) may be used to denote the logical name space 320 for all items on the site 300. "C" represents context, "T" represents type, and "N" represents name. Table I illustrates an example of logical name space information.

TABLE 1

\\msnbc-733162\c
News
    001.stry
    U.S.
        002.stry
        003.stry
    INTL
        Africa
            004.stry
        Asia
            005.stry
    Business
        006.stry
        007.stry The context manager 200 of the staging server 10 can use the n-tuple to address any item in the logical content store 310. For example, in order to access the logical object "002.stry", the context manager 200 could use the address \\msnbc-733162\c/news/us/002.stry. In this address, "msnbc-733162\c" provides context, "news/us/" provides type, and "0.002.stry" provides the name. Accordingly, the logical name space 320 can represent the full path to the file location in the file system. A logical address without the context portion is called the relative address. Identification of a logical object in the system of the invention requires only the relative address. Use of the relative address alone facilitates modification of file locations. For example, if the above-identified file is move to the archive store 330, the resultant structure is shown in Table 2.

TABLE 2

\\msnbc-733162\archive\2003\c
News
    001.stry
    U.S.
        002.stry
        003.stry
    INTL
        Africa
            004.stry
        Asia
            005.stry
    Business
        006.stry
        007.stry Thus, if the context manager 200 cannot find a file in context \\msnbc-733162\c, it can change the context to \\msnbc-733162\archive\2003\c to try to find it in the archive store 330. Logical objects may be moved to the archive store 330 upon expiration.

The physical sites 410 and 420 include the actual rendering from the logical site 300. Physical objects in physical sites 410 and 420 contain not only contents but also presentation information for the web browsers. The Internet server 440 returns these physical objects to the end users for viewing.

An n-tuple may also be used to address items in the physical sites 410 and 420. For physical site addressing, all three parts of the n-tuple ($C_1, C_2 \ldots C_k, T_1, T_2 \ldots T_m, N_1, N_2 \ldots N_n$) may be used. Table 3 illustrates a physical site content store. The XML files shown in Table I have been rendered to HTML files for the web site. In the displayed example, the physical pages are stored under the physical site context MSNBC at c:\sites\msnbc. The physical pages now have an extension ".htm" rather than ".stry".

TABLE 3

C:\sites\msnbc
News
    001.htm
    U.S.
        002.htm
        003.htm
    INTL
        Africa
            004.htm
        Asia
            005.htm
    Business
        006.htm
        007.htm The context manager 200 is responsible for rendering and delivery of physical objects to the physical sites 410 and 420 and to the requester.

Figure 4:
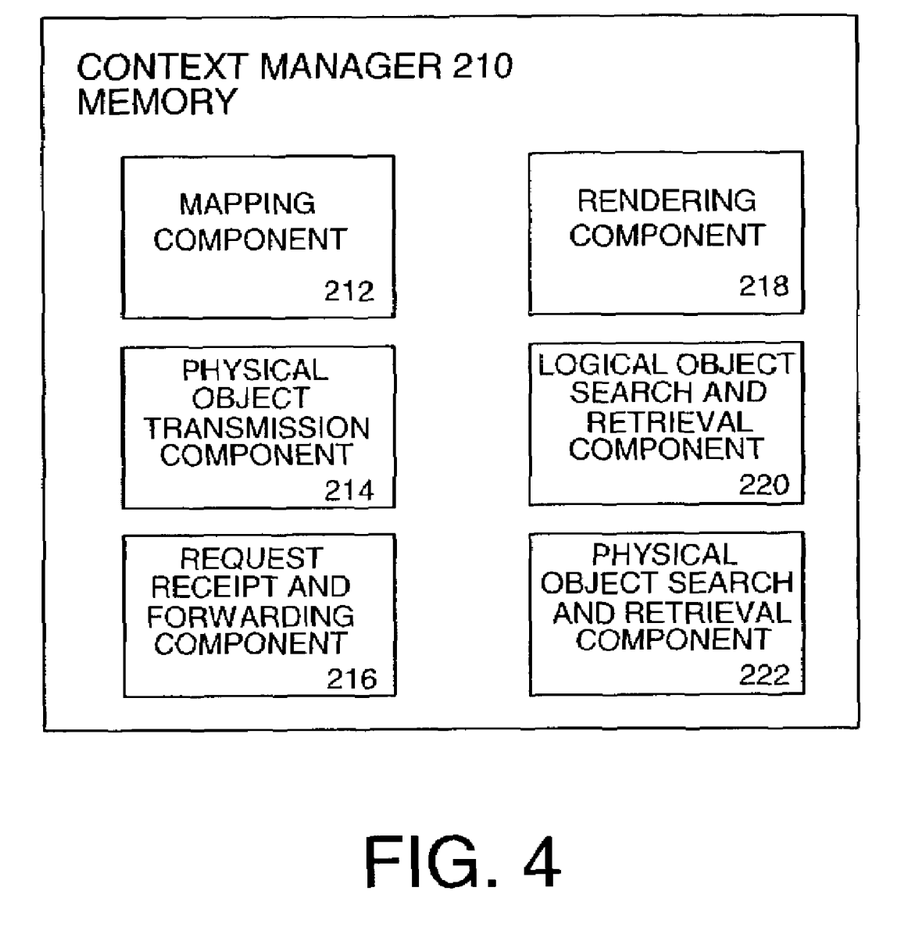
FIG. 4 is a block diagram illustrating components of a context manager memory in accordance with an embodiment of the invention.

FIG. 4 illustrates a context manager memory 210 in an embodiment of the invention. The memory 210 may include one or more of the types of memory devices described above with reference to FIG. 2. The context managers 200 and 201 may include a mapping component 212, a physical object transmission component 214, a request receipt and forwarding component 216, a rendering component 218, a logical object search and retrieval component 220, and a physical object search and retrieval component 222. Each of these components is further described below.

Although both the web server context manager 201 and the staging server context manager 200 may have the above identified components, the components are further described in connection with the staging server 10 and the staging server context manager 200. Although the two context managers 200 and 201 may have the same components, rendering of the physical objects is performed within the staging server 10. Thus, the staging server context manager 200 provides a more illustrative example of how each component is used.

The mapping component 212 provides the necessary tools to perform context switching. Since the logical content store 310 uses the logical address and Internet servers 430 and 440 need the physical address to locate the actual physical objects, a mapping is needed between logical and physical addresses. The mapping of logical addresses to physical addresses is called context switching. The mapping component 212 includes a Hypertext Transfer Protocol (HTTP) handler registered with and loaded by Internet server 430. The HTTP handler extends Internet server capabilities by intercepting HTTP requests before Internet server 430 processes the requests. The mapping component 212 takes the logical addresses from user requests and maps them instantaneously into the best-fit physical addresses according to device and language preferences.

For example, a user may request the story page "002.stry" by requesting news/us/002.stry. The mapping component 212 of the context manager 200, implemented as a HTTP handler for ".stry" content, may be invoked to retrieve the story. The context manager 200 may determine user device and browser capabilities and decide on a context. By appending the logical address to the context, the physical address is determined by the context manager 200 to be (C:\sites\msnbc, news, us, 002, htm). Thus the page at C:\sites\msnbc\news\us\002.htm is sent back to the user. If the mapping component 212 finds an address for a physical page that does not exist yet, the rendering component 218 may render the physical object page and may bind the logical story news/us/002.stry to its extensible style language transformation (XSLT) style sheet.

In order to effectively implement context switching, logical addresses should be consistent across physical sites. The last part of the logical address that represents the file extension may change, but other portions of the logical address should remain the same.

The rendering component 218 is responsible for rendering a physical object from a retrieved logical object. Rendering is the process of producing pages in HTML so that the requester's web browsers can display them. As part of the context switching process, the context manager 200 uses the rendering component 218 to render the logical object from the logical site 300 to a physical object as stored in the physical sites 410 and 420 if the requested physical object does not already exist. To do this, the context manager 200 may use an XML tree structure as depicted in Table 4 to decide which XSLT style sheet to use for rendering. For example, for a mobile site, the style sheet for ".stry" objects would be in "T\mobile\story.xslt". The root path for the templates is defined in the configuration file also.

TABLE 4

```
<pages.template>
    <msnbc>
        <stry>T\msnbc\story.xslt</stry>
        <frnt>T\msnbc\front\front.xslt</frnt>
        <list module="y" style="T/msnbc/list.xslt">T\msnbc\module.xslt</list>
        <plst module="y" style="T/msnbc/plst.xslt">T\msnbc\module.xslt</plst>
        <proj>T\project.xslt</proj>
    </msnbc>
    <mobile>
        <stry>T\msnbc\story.xslt</stry>
        <frnt>T\mobile \front\front.xslt</frnt>
        <list module="y" style="T/msnbc/list.xslt">T\msnbc\module.xslt</list>
        <plst module="y" style="T/msnbc/plst.xslt">T\msnbc\module.xslt</plst>
        <proj>T\project.xslt</proj>
    <mobile>
</pages.template>
```

The rendering process takes the files from the logical site 300 and creates output pages in formats such as HTML, ASP, or its successor ASPX (the ASP.NET page). for particular presentation characteristics. Thus, the system is flexible enough to create HTML, which is optimal under heavy loads, and/or ASP.NET pages, which require additional server processing before being returned to the user as HTML. Also, the system is flexible enough to allow different physical sites to use different formats. For example, the physical site for mobile devices and personal digital assistants (PDAs) might use only HTML, while the physical site for a desktop user might only use the ASP.NET pages. The rendering component 218 of the context manager 200 is responsible for rendering files from the logical site 300 into physical pages so that each user receives a physical page that best fits within device characteristics.

The context manager memory 210 also may include the physical object transmission component 214. The physical object transmission component 214 transmits the rendered physical object to the storage areas containing the physical sites 410 and 420 or directly to the requester. The context manager memory 210 additionally includes the request receipt and forwarding component 216 for receiving user URL requests and forwarding the requests between servers if necessary.

The logical object search and retrieval component 220 seeks to retrieve the logical object from the logical content store 310. If the logical object is not contained within the logical content store 310, the logical object search and retrieval component 220 looks for the logical object in the archive store 330 and returns the logical object from wherever it is found. The corresponding physical object search and retrieval component 222 retrieves and forwards the physical object from the physical sites 410 and 420.

Figure 6:
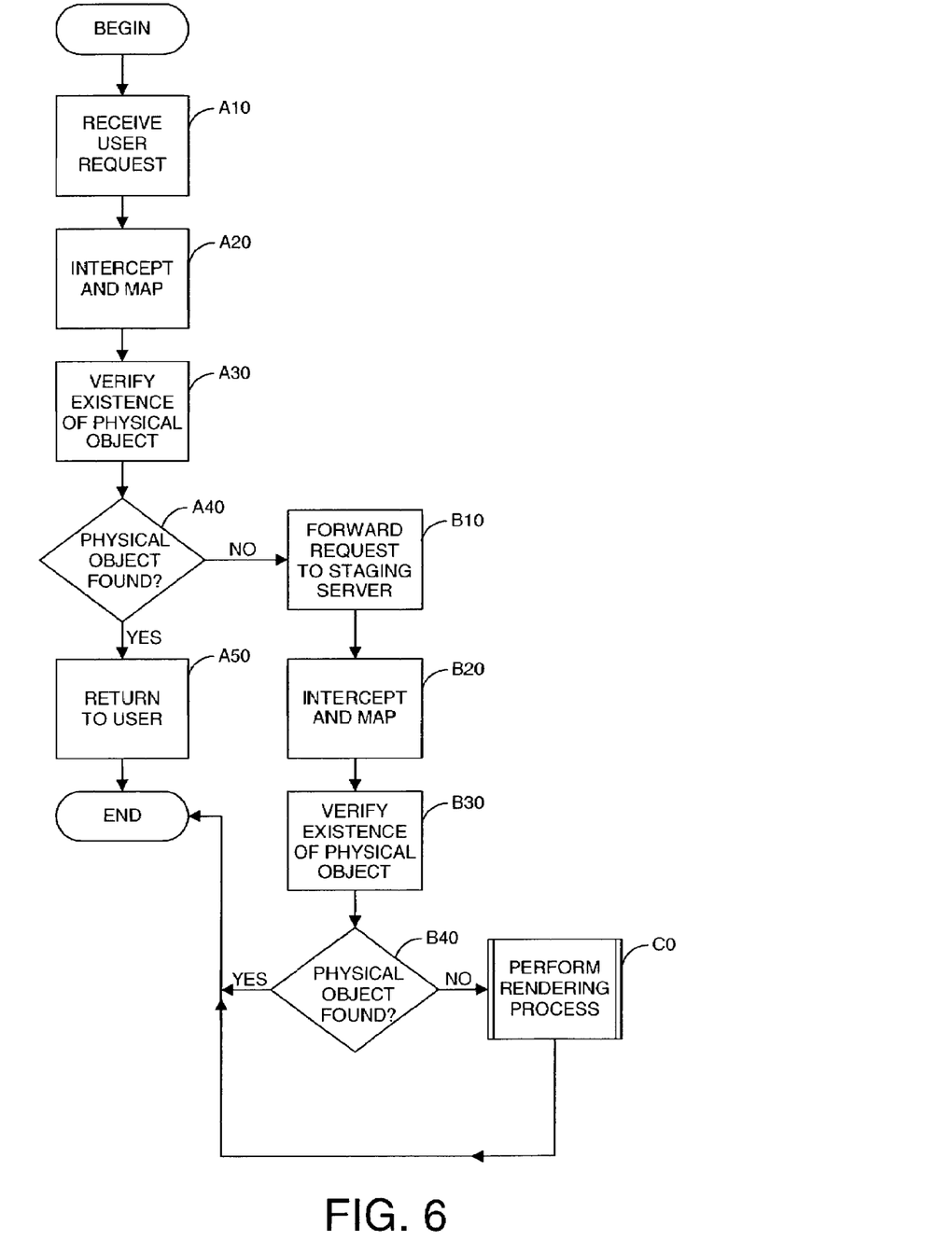
FIG. 6 is a flow chart illustrating a method for publishing site content in accordance with an embodiment of the invention.

FIG. 6 illustrates a method for producing a physical object for a web site using an embodiment of the invention as shown in FIG. 3. In step A10, the content management system receives a user request. Typically, a user will forward a URL request to the Internet server 440.

In step A20, the web server context manager 201 intercepts and maps the request. For example, the web server context manager 201 intercepts the URL represented in a logical address such as http://www.msnbc.con/news/001.stry. The context manager 201 uses the mapping component 212 to map the logical address to a proper physical address based on device characteristics, language, or user preferences. For example, if the user were using a PDA or other handheld or mobile computing device, the physical address would be http://www.msnbc.com/mobile/news/001.htm.

In step A30, the web server context manager 201 verifies the existence of a physical object in the web server physical sites 420. In step A40, if the physical object is found, the context manager 201 returns the physical object to the requester in step A50 using the physical object search and retrieval component 222. In the preceding example, the context manager 201 verifies that the physical object http://www.msnbc.commobile/news/001.htm exists. If the physical object already exists, it is returned to the user.

If the physical object is not found in step A40, the context manager 201 forwards the HTTP request using the request receipt and forwarding component 216 to the staging server 10 in step B10.

In step B20, the staging server context manager 210 intercepts and maps the request using the above-described mapping component 212. In step B30, the staging server context manager 210 verifies the existence of the physical object using the physical object search and retrieval component 222. If a physical object is found in step B40, it is returned to the requester.

If the physical object is not found in step B40, the context manager 200 on the staging server 10 may perform a rendering process using the rendering component 218 in procedure C0. The rendering process is further described below with reference to FIG. 7.

Figure 7:
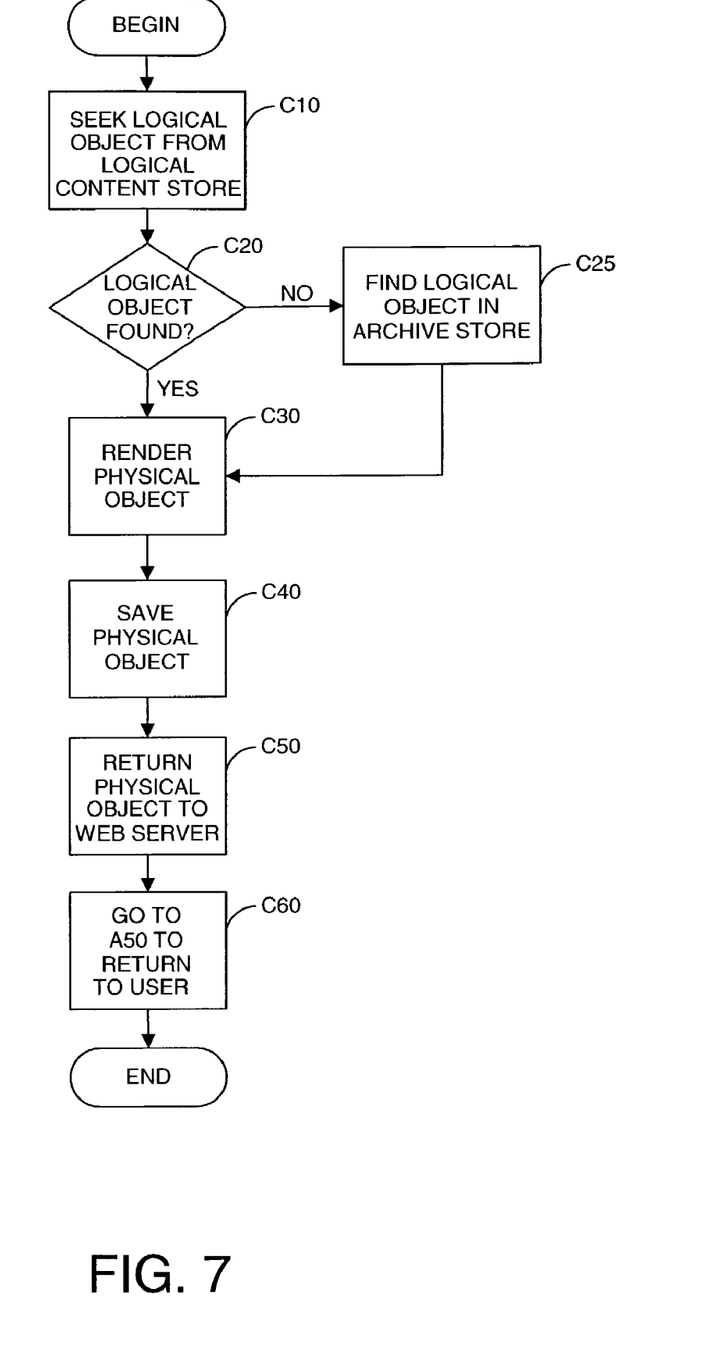
FIG. 7 is a flow chart illustrating a rendering process in accordance with an embodiment of the invention.

FIG. 7 illustrates details of the rendering process in accordance with an embodiment of the invention. In step C10, the staging server context manager 210 seeks the corresponding logical object from the logical content store. If the logical object is not found in step C20, the context manager 200 may retrieve the logical object from the archive store in step C25. In the present example, the context manager 200 would search for logical object "news/ 001.stry" from the logical content store 310. If the logical object cannot be found in the logical content store 310, the context manager 200 may search the archive store 330. Accordingly, when a page is archived, it can still have active links pointing to it from other pages.

Once the logical object is found, the rendering component of the staging server context manager 210 renders the physical object in step C30. The rendering component 218 would render the physical object according to the context, which in this example is the mobile context.

In step C40, the staging server context manager 210 saves the physical object in the physical sites 410. Therefore, if the same object is requested again, the context manager will simply load it and return it as a response to the HTTP request.

In step C50, the staging server context manager 210 returns the physical object to the web server. In step C60, the process returns to C50 of FIG. 6 to return the physical object to the user. The context manager 200 may also save the rendered physical object locally in the physical sites 420 in order to respond to a next request. The physical sites 420 could be in stored in any type of memory or on file system or both.

With logical content organized in the logical content store 310, the system can publish the content by copying the logical content to the staging server 10. The staging server 10 will contain the logical site 300 and all the web servers 20 will build up the physical sites 410 and 420 dynamically on demand.

In an embodiment of the system of the invention, logical objects can expire automatically or manually. When a logical object expires, it is moved to the archive store 330. The archive store 330 can be on the staging server 10 as shown in FIG. 3 or alternatively can be located on a separate archive server. The name space on the archive store 330 is the same as the logical name space except for the context. For example, if the story (log, news, us, 003, stry) in Table 1 expires, the story will be moved to the name space (c:\archive, 2003, news, us, 003, stry). Table 5 represents the archive name space.

TABLE 5

C:\archive
2003
News
U.S.
002.stry

When a user requests a page that has been archived in the archive store 330, the context manager 200 will follow the steps set forth above with reference to FIG. 6. The context manager will try to find the physical object in the physical site as usual. When the context managers 201 and 200 fail to find the physical object, the context manager 200 will search for the logical object in the logical content store 310. In this case, it cannot find the logical object either. The context manager 200 will roam the archive content store 330 for the missing logical object. All of the archive stores information is stored in the configuration file for the context manager 200 as depicted in Table 6. The context manager 200 will use the archive context in Table 6 to locate the logical object. If the object is found, the context manager will then render the physical object and return it to the web server.

TABLE 6

<pages.archive>
   <add key="2003" value=\\msnbc-pokemon\Archives\2003\c"/>
   <add key="2002" value=\\msnbc-pokemon\Archives\2002\c"/>
</pages.archive>

Figure 5:
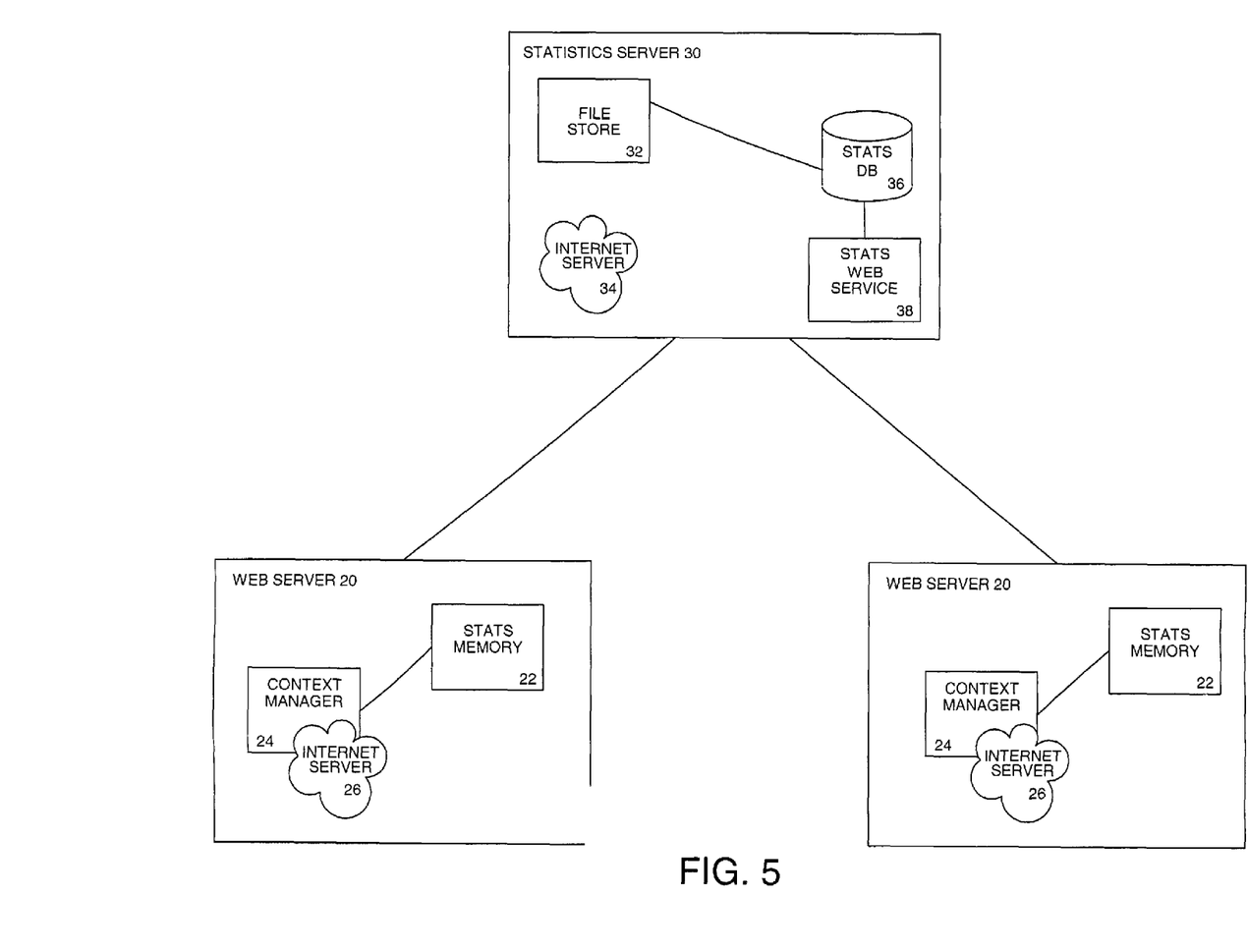
FIG. 5 is a block diagram illustrating a system architecture in accordance with an additional embodiment of the invention.

FIG. 5 illustrates an embodiment of the invention implementing a statistics server 30. The web servers 20 include a statistics memory 22, a context manager 24, and an Internet server 26. The web servers 20 communicate with a statistics server 30. The statistics server 30 includes a file store 32, a statistics database 36, a statistics web service 38 and Internet server 34.

The use of context manager 24 greatly simplifies the accumulation of real-time statistics. The context manager 24 maps all logical addresses into the physical addresses. Therefore, the context manager 24 is able to track a number of page views for the physical pages. Each web server 20 accumulates the statistics in memory 22 for a period of time. At predetermined intervals, each web server 20 may post messages to the statistics server 30 so that all numbers from each web server 20 can be totaled.

The process of statistics accumulation occurs in a continuous manner. The user submits a URL request to the web server 20. The context manager 24 intercepts the URL request. The context manager 24 accumulates the statistics in memory 22 for this particular web server 20. At predetermined time intervals, for example 3 seconds, the statistics accumulated in memory are sent to the statistics web service 38. The statistics web service 38 stores the statistics into the statistics database 36. The insertion of statistics into the statistics database 36 triggers a process to generate real-time statistics report in XML format. Optionally, data feeds such as the top 10 most popular stories can be generated in XML and used by the site as well. The real-time statistics report can be formatted with a style sheet and viewed by users.

The above-described system proposes a new method of storing, publishing, rendering and serving web site content. The system of the invention is capable of providing on-demand and instant publishing. Replication software is no longer needed and the web servers are managed. Physical sites can be added and can support users with different resolution screens. All physical sites are self-maintained on the web servers. At any given time, all of the physical sites on the web servers can be deleted and they will be regenerated automatically upon receipt of user requests. Only the logical site on the staging server requires management. Repurposing or changing the look and feel of the physical objects is as simple as changing the style sheets.

Real time statistics provide instant feedback and can be used to export data feeds to internal or partners web sites. The context manager also facilitates context switching depending on user preferences, access devices, browser capabilities, language settings, site load, and different site versions. Having a unified information store with a common representation for content makes content repurposing simple. While the context manager intercepts all requests for objects, it can also accumulate relevant statistics in real-time.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and with the scope of the claims.

We claim:

1. A context management system for facilitating publication of web site content, the context management system comprising:
    a memory;
    one or more processors;
    a logical object retrieval component for retrieving a logical object from a logical content store, wherein the logical object is content without presentation information that instructs a web browser how to display the content;
    a rendering component for creating a physical object using the logical object and a template selected based on a capability of a requesting web browser, wherein the physical object is an object that contains presentation information that instructs the web browser how to display the content;
    a mapping component for mapping a physical address and a logical address wherein the physical address is needed to locate the physical object and the logical address is needed to access the logical object and wherein the mapping component determines the physical address based on the logical address and the capability of the requesting web browser; and
    a physical object transmission component for transmitting the physical object to the requesting web browser.

2. The system of claim 1, wherein the context management system comprises a physical object search and retrieval component for searching for the physical object in a physical site storage area and for retrieving the physical object from the physical site storage area.

3. The system of claim 1, further comprising a request receipt and forwarding component for receiving a user request for the physical object.

4. The system of claim 1, further comprising a component for accumulating statistics and forwarding the statistics to a statistics storage area.

5. The system of claim 1, wherein the logical object retrieval component includes a component for retrieving the logical object from an archive store.

6. A staging server system for transmitting a requested physical object to a web server, wherein a physical object is an object that contains presentation information that instructs a web browser how to display content, the staging server system comprising:
    a memory;
    one or more processors;
    a logical content store for storing a logical object, wherein the logical object is the content without presentation information that instructs the web browser how to display the content; and
    a staging server context manager including a logical object retrieval component for retrieving the logical object from the logical content store, a rendering component for creating the physical object using the logical object and a template selected according to a capability of a requesting web browser;
    a mapping component for mapping a physical address and a logical address wherein the physical address is needed to locate the physical object and the logical address is needed to access the logical object and wherein the mapping component determines the physical address based on the logical address and the capability of the requesting web browser; and
    a physical object transmission component for transmitting the physical object to the requesting web browser.

7. The system of claim 6, further comprising a physical site storage area for storing rendering physical objects.

8. The system of claim 7, wherein the staging server context manager comprises a physical object search and retrieval component for locating and retrieving components from the physical site storage area.

9. The system of claim 6, further comprising a logical name space for indexing logical objects in the logical content store.

10. The system of claim 6, further comprising an archive store for archiving expired logical objects.

11. The system of claim 6, wherein the rendering component renders the physical object according to a selected context.

12. The system of claim 6, wherein the staging server context manager comprises a request receipt and forwarding component for receiving a user request for the physical object.

13. The system of claim 6, where the staging server context manager comprises a component for accumulating statistics and forwarding the statistics to a statistics storage area.

14. The system of claim 6, where the logical object retrieval component includes a component for retrieving the logical object from an archive store.

15. A system for publishing web site content for a requester, the system comprising:
    a memory;
    one or more processors;
    a staging server comprising a logical content store for storing logical content and a staging server context manager including a rendering component for creating a physical object from the logical content and a template selected according to a capability of a requesting web browser, wherein the logical content is content without presentation information that instructs a web browser how to display it, and wherein the physical object is an object that contains presentation information that instructs the web browser how to display the object content;
    a mapping component for mapping a physical address and a logical object wherein the physical address is needed to locate the physical object and the logical address is needed to access the logical object and wherein the mapping component determines the physical address based on the logical address and the capability of the requesting web browser; and a web server for seeking a requested physical object, the web server comprising a web server context manager for seeking the requested physical object from the staging server and for returning the requested physical object to the requesting web browser.

16. The system of claim 15, further comprising a physical site storage area for storing rendered physical objects.

17. The system of claim 16, wherein the staging server context manager and the web server context manager comprise a physical object search and retrieval component for locating and retrieving components from the physical site storage area.

18. The system of claim 15, wherein the staging server further comprises a logical name space for indexing logical objects in the logical content store.

19. The system of claim 15, further comprising an archive store for archiving expired logical objects.

20. The system of claim 15, wherein the rendering component renders the physical object based on context.

21. The system of claim 15, wherein the staging server context manager and the web server context manager comprise a request receipt and forwarding component for receiving a user request for the physical object.

22. The system of claim 15, wherein the web server context manager comprises a component for accumulating statistics and forwarding the statistics to a statistics storage area.

23. The system of claim 22, wherein the staging server includes a statistics component for generating real-time statistics reports.

24. The system of claim 15, wherein the web server context manager comprises a component for retrieving the logical object from an archive store.

25. A method for transmitting a physical object to a requester upon receiving a request for the physical object at a web server, wherein the physical object is an object that contains presentation information that instructs a web browser how to display content, the method comprising:
  searching for the physical object in a web server physical site;
  requesting the physical object from a staging server if the physical object is not in the web server physical site and searching a staging server physical site for the requested physical object;
  retrieving a corresponding logical object from a staging server logical content store if the physical object is not in the staging server physical site, wherein a logical object is the content without presentation information that instructs the web browser how to display the content;
  creating the physical object from the logical object and a template selected according to a capability of a requesting web browser if no physical object is retrieved;
  mapping a logical address to an appropriate physical object wherein the logical address is needed to access the logical object and the physical address is needed to locate the physical object and wherein the appropriate physical object is determined based on the capability of the requesting web browser; and
  returning the physical object to the requesting web browser.

26. The method of claim 25, further comprising rendering the physical object based on a capability of a requesting browser.

27. The method of claim 25, further comprising selecting an appropriate style sheet for rendering.

28. The method of claim 25, further comprising using a logical name space to retrieve the logical object.

29. The method of claim 25, further comprising implementing a physical object search and retrieval component for searching for the physical object in a physical site storage area and for retrieving the physical object from the physical site storage area.

30. The method of claim 25, further comprising accumulating statistics and forwarding the statistics to a statistics storage area.

31. The method of claim 25, further comprising retrieving the logical object from an archive store.

32. One or more computer-readable storage media having computer-executable instructions for performing a method for transmitting a physical object to a requester upon receiving a request for the physical object at a web server, wherein the physical object is an object that contains presentation information that instructs a web browser how to display content, the method comprising:
  searching for the physical object in a web server physical site;
  requesting the physical object from a staging server if the physical object is not in the web server physical site and searching a staging server physical site for the requested physical object;
  retrieving a corresponding logical object from a staging server logical content store if the physical object is not in the staging server physical site, wherein a logical object is the content without presentation information that instructs the web browser how to display the content;
  creating the physical object from the logical object and a template selected according to a capability of a requesting web browser if no physical object is retrieved;
  mapping a logical address to an appropriate physical object wherein the logical address is needed to access the logical object and the physical address is needed to locate the physical object and wherein the appropriate physical object is determined based on the capability of the requesting web browser; and
  returning the physical object to the requesting web browser.

* * * * *

UNITED STATES PATENT AND TRADEMARK OFFICE
CERTIFICATE OF CORRECTION

| | | |
|---|---|---|
| PATENT NO. | : 7,359,963 B1 | Page 1 of 1 |
| APPLICATION NO. | : 10/457119 | |
| DATED | : April 15, 2008 | |
| INVENTOR(S) | : Jong Huang et al. | |

It is certified that error appears in the above-identified patent and that said Letters Patent is hereby corrected as shown below:

In column 14, line 60, in Claim 15, before "content;" delete "object".

Signed and Sealed this
Fifteenth Day of February, 2011

David J. Kappos
*Director of the United States Patent and Trademark Office*